(12) United States Patent
Nakano (10) Patent No.: US 10,267,252 B2
(45) Date of Patent: Apr. 23, 2019

(54) CONTROLLER FOR INTERNAL COMBUSTION ENGINE AND METHOD FOR CONTROLLING INTERNAL COMBUSTION ENGINE

(71) Applicant: TOYOTA JIDOSHA KABUSHIKI KAISHA, Toyota-shi, Aichi-ken (JP)

(72) Inventor: Tomohiro Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 191 days.

(21) Appl. No.: 15/608,425

(22) Filed: May 30, 2017

(65) Prior Publication Data

US 2018/0003120 A1 Jan. 4, 2018

(30) Foreign Application Priority Data

Jun. 29, 2016 (JP) ................................. 2016-129021

(51) Int. Cl.
*F02D 41/18* (2006.01)
*F02D 41/34* (2006.01)
(Continued)

(52) U.S. Cl.
CPC ........... *F02D 41/182* (2013.01); *F02D 41/02* (2013.01); *F02D 41/34* (2013.01); *F02D 41/36* (2013.01); *F02D 41/40* (2013.01); *F02D 41/402* (2013.01); *F02D 2041/1432* (2013.01); *F02D 2200/0602* (2013.01); *F02D 2200/0604* (2013.01);
(Continued)

(58) Field of Classification Search
CPC ........ F02D 41/02; F02D 41/182; F02D 41/34; F02D 41/36; F02D 41/40; F02D 41/402; F02D 2200/0602; F02D 2200/0604; F02D 2200/0618
See application file for complete search history.

(56) References Cited

U.S. PATENT DOCUMENTS 5,699,772 A 12/1997 Yonekawa et al.
5,732,675 A * 3/1998 Yoshida ................ F02D 41/008
123/305

(Continued)

FOREIGN PATENT DOCUMENTS

EP 2 666 996 A1 11/2013
JP H08-200124 A 8/1996
(Continued)

*Primary Examiner* — Erick R Solis
*Assistant Examiner* — Anthony L Bacon
(74) *Attorney, Agent, or Firm* — Oliff PLC (57) ABSTRACT

A controller for an internal combustion engine is configured to control the fuel injection valve so that the fuel injection valve selectively performs partial lift injection, which does not open a valve member at a fully open position, and full lift injection, which opens the valve member at the fully open position. The internal combustion engine includes the fuel injection valve and a fuel supply system. The controller includes an energizing time setting unit, a fuel pressure calculation unit, and a smoothening process unit. The energizing time setting unit is configured to set an energizing time for the full lift injection based on graded fuel pressure calculated by the smoothening process unit and set an energizing time for the partial lift injection based on fuel pressure calculated by the fuel pressure calculation unit.

9 Claims, 6 Drawing Sheets

(51) Int. Cl.
*F02D 41/36* (2006.01)
*F02D 41/02* (2006.01)
*F02D 41/40* (2006.01)
F02M 69/04 (2006.01)
F02D 41/14 (2006.01)

(52) U.S. Cl.
CPC ... *F02D 2200/0618* (2013.01); *F02M 69/046* (2013.01); *Y02T 10/44* (2013.01)

(56) References Cited

U.S. PATENT DOCUMENTS

| | | | | |
|---|---|---|---|---|
| 2008/0236547 | A1* | 10/2008 | Takahashi | F02D 41/2467 123/447 |
| 2011/0295490 | A1* | 12/2011 | Tsuji | F02D 41/3011 701/103 |
| 2012/0130620 | A1* | 5/2012 | Pelizzoni | F02D 41/402 701/103 |
| 2015/0046066 | A1* | 2/2015 | Miyaura | F02D 41/0085 701/104 |
| 2015/0369158 | A1 | 12/2015 | Nakajima et al. | |
| 2015/0377172 | A1 | 12/2015 | Higuchi et al. | |

FOREIGN PATENT DOCUMENTS

| | | |
|---|---|---|
| JP | 2010-101296 A | 5/2010 |
| JP | 2015-121231 | 7/2015 |
| JP | 2016-008542 A | 1/2016 |
| JP | 2016-008569 A | 1/2016 |
| JP | 2016-033343 A | 3/2016 |

\* cited by examiner

CONTROLLER FOR INTERNAL COMBUSTION ENGINE AND METHOD FOR CONTROLLING INTERNAL COMBUSTION ENGINE

BACKGROUND

The present invention relates to a controller for an internal combustion engine.

Japanese Laid-Open Patent Publication No. 2015-121231 discloses a controller that controls the energizing of a fuel injection valve, which injects fuel into a combustion chamber of an internal combustion engine. The fuel injection valve includes a valve member that opens when the fuel injection valve is energized to inject fuel. The fuel injection valve performs partial lift injection or full lift injection. When the partial lift injection is performed, the fuel injection valve is energized to move the valve member in a valve opening direction and de-energized before the valve member reaches a fully open position. When the full lift injection is performed, the fuel injection valve is energized to move the valve member in the valve opening direction and de-energized after the valve member reaches the fully open position.

The above controller calculates a request fuel injection amount, which is a request value of the amount of fuel injected from the fuel injection valve for each combustion performed in the combustion chamber, in accordance with the driving state of the internal combustion engine. The fuel injection valve injects fuel corresponding to the request fuel injection amount by performing the partial lift injection or the full lift injection. In the partial lift injection and the full lift injection, fuel pressure, which is the pressure of the fuel supplied to the fuel injection valve, changes the relationship of the energizing time of the fuel injection valve and the fuel injection amount. Thus, when performing the partial lift injection and the full lift injection, the internal combustion engine controller calculates the energizing time of the fuel injection valve based on the fuel pressure and the request fuel injection amount.

As described above, the fuel pressure needs to be reflected on the calculation of the energizing time. In the partial lift injection, the fuel injection valve is de-energized before the valve member reaches the fully open position. Thus, a valve opening delay of the valve member when the fuel injection valve is energized and the valve opening speed of the valve member will greatly affect the injection amount. Additionally, the fuel pressure when the energizing is started greatly affects the valve opening delay and the valve opening speed. When the full lift injection is performed, the energizing time is long, and a large amount of fuel is injected with the valve member located at the fully open position. Thus, a valve opening delay or a valve opening speed of the valve member subtly affects the injection amount. However, since a large amount of fuel is injected, fuel is continuously injected. This increases the reduction rate of the fuel pressure. Thus, changes in the fuel pressure that occur during the fuel injection need to be considered when the energizing time is calculated in the full lift injection.

As described above, the fuel pressure affects the relationship of the energizing time and the fuel injection amount in manners that differ between the partial lift injection and the full lift injection. Thus, to improve the accuracy for controlling the amount of fuel injected from the fuel injection valve, it is desired that the differences in the effect of the fuel pressure be considered when calculating the energizing time for each of the partial lift injection and the full lift injection.

However, Japanese Laid-Open Patent Publication No. 2015-121231 includes no teaching of such calculations.

SUMMARY

It is an object of the present invention to provide a controller for an internal combustion engine that improves the accuracy for controlling an injection amount in each of the partial lift injection and the full lift injection.

In a controller for an internal combustion engine that achieves the above object, the internal combustion engine includes a fuel injection valve and a fuel supply system. The fuel injection valve includes a valve member that opens and injects fuel when energized. The fuel supply system supplies fuel to the fuel injection valve. The controller is configured to control the fuel injection valve so that the fuel injection valve selectively performs partial lift injection, which does not open the valve member at a fully open position, and full lift injection, which opens the valve member at the fully open position. The controller includes an energizing time setting unit configured to set an energizing time of the fuel injection valve, a fuel pressure calculation unit configured to calculate fuel pressure, which is pressure of the fuel supplied to the fuel injection valve, and a smoothening process unit configured to perform a smoothening process on the fuel pressure calculated by the fuel pressure calculation unit to calculate graded fuel pressure, at which fluctuation of the fuel pressure that occurs when the fuel injection valve injects fuel is smoothened. The energizing time setting unit is configured to set an energizing time for the full lift injection based on the graded fuel pressure calculated by the smoothening process unit and set an energizing time for the partial lift injection based on the fuel pressure calculated by the fuel pressure calculation unit.

In a method for controlling an internal combustion engine that achieves the above object, the internal combustion engine includes a fuel injection valve and a fuel supply system. The fuel injection valve includes a valve member that opens and injects fuel when energized. The fuel supply system supplies fuel to the fuel injection valve. The method includes setting an energizing time of the fuel injection valve; calculating fuel pressure, which is pressure of the fuel supplied to the fuel injection valve; performing a smoothening process on the calculated fuel pressure to calculate graded fuel pressure, at which fluctuation of the fuel pressure that occurs when the fuel injection valve injects fuel is smoothened; controlling the fuel injection valve so that the fuel injection valve selectively performs partial lift injection, which does not open the valve member at a fully open position, and full lift injection, which opens the valve member at the fully open position; setting an energizing time for the full lift injection based on the calculated graded fuel pressure; and setting an energizing time for the partial lift injection based on the calculated fuel pressure.

In a controller for an internal combustion engine that achieves the above object, the internal combustion engine includes a fuel injection valve and a fuel supply system. The fuel injection valve includes a valve member that opens and injects fuel when energized. The fuel supply system supplies fuel to the fuel injection valve. The controller includes circuitry configured to control the fuel injection valve so that the fuel injection valve selectively performs partial lift injection, which does not open the valve member at a fully open position, and full lift injection, which opens the valve member at the fully open position. The circuitry is configured to perform setting an energizing time of the fuel injection valve; calculating fuel pressure, which is pressure of the fuel supplied to the fuel injection valve; performing a smoothening process on the calculated fuel pressure to calculate graded fuel pressure, at which fluctuation of the fuel pressure that occurs when the fuel injection valve injects fuel is smoothened; setting an energizing time for the full lift injection based on the calculated graded fuel pressure; and setting an energizing time for the partial lift injection based on the calculated fuel pressure.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with. objects and advantages thereof, may best be understood by reference to the following description of the presently preferred embodiments together with the accompanying drawings in which.

DETAILED DESCRIPTION

First Embodiment

A first embodiment of a controller for an internal combustion engine will now be described with reference to FIGS. 1 to 7.

Figure 1:
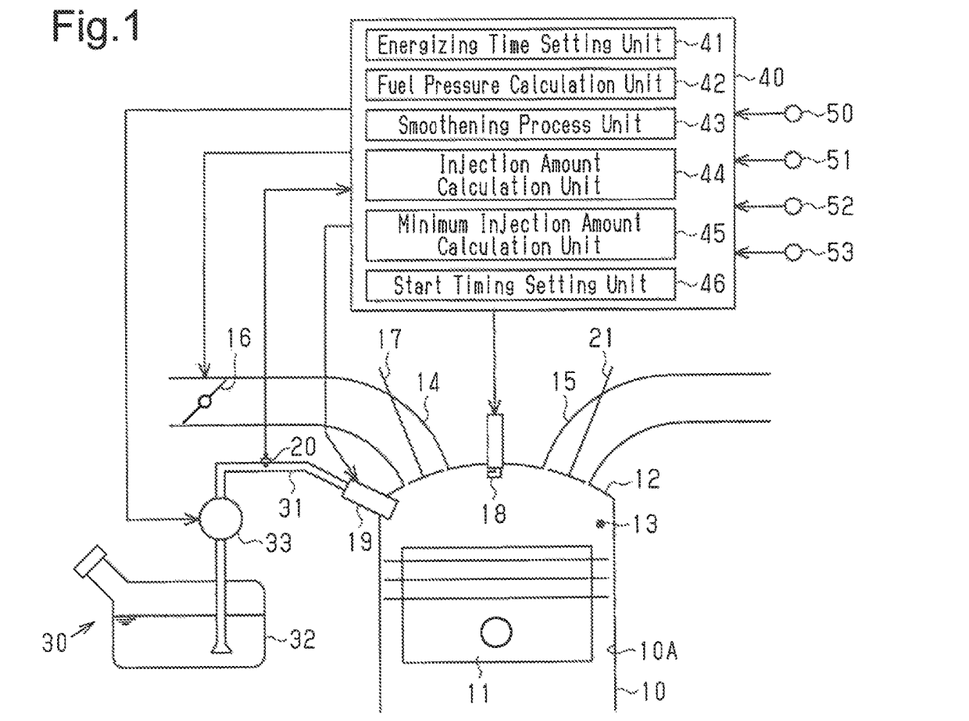
FIG. 1 is a schematic diagram showing the structure of a first embodiment of a controller for an internal combustion engine.
Figure 2:
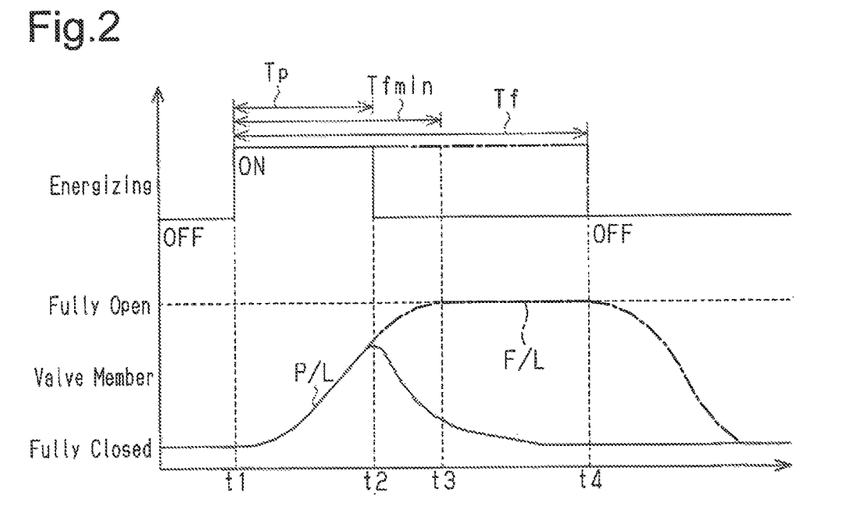
FIG. 2 is a timing chart showing the relationship between the energizing mode and the valve member operation mode in partial lift injection and full lift injection performed by the controller of FIG. 1.

As shown in 1, the internal combustion engine includes a cylinder block 10 that includes a plurality of cylinders 10A (only one shown). Each of the cylinders 10A accommodates a piston 11 in a slidable manner. The cylinder block 10 has an upper end to which a cylinder head 12 is coupled. The cylinder 10A, the piston 11, and the cylinder head 12 define a combustion chamber 13.

The combustion chamber 13 is connected to an intake passage 14 and an exhaust passage 15. The intake passage 14 accommodates a throttle valve 16, which adjusts the amount of intake air drawn into the combustion chamber 13. The internal combustion engine includes an intake valve 17, which communicates the intake passage 14 and the combustion chamber 13 and interrupts the communication. The intake air is drawn from the intake passage 14 into the combustion chamber 13 when the intake valve 17 is open. A spark plug 18 and a fuel injection valve 19 are arranged in the combustion chamber 13. Fuel is supplied to the fuel injection valve 19 through a fuel supply system 30.

The fuel supply system 30 includes a fuel supply passage 31, one end of which is connected to the fuel injection valve 19. The other end of the fuel supply passage 31 is located in a fuel tank 32, which stores the fuel. A fuel pump 33 is located in the path of the fuel supply passage 31. The fuel pump 33, which is, for example, of an electrically-driven type, pumps the fuel from the fuel tank 32 into the fuel supply passage 31. The fuel pumped into the fuel supply passage 31 is supplied to the fuel injection valve 19. A fuel pressure sensor 20 is located in the fuel supply passage 31 between the fuel pump 33 and the fuel injection valve 19 to detect fuel pressure, which is the pressure of fuel in the fuel supply passage 31, that is, the pressure of fuel supplied to the fuel injection valve 19.

The fuel injected from the fuel injection valve 19 into the combustion chamber 13 is mixed with the intake air drawn through the intake passage 14 to produce an air-fuel mixture. The produced air-fuel mixture is ignited and combusted by the spark plug 18 at a predetermined timing. The internal combustion engine also includes an exhaust valve 21, which communicates the combustion chamber 13 and the exhaust passage 15 and interrupts the communication. The exhaust gas produced by the combustion is discharged from the combustion chamber 13 to the exhaust passage 15 when the exhaust valve 21 is open.

A controller 40 for an internal combustion engine may include, for example, control circuitry. More specifically, the controller 40 may include one or more dedicated hardware circuits such as ASICs, one or more processors that operate in accordance with computer programs (software), or the combination of these. Each processor includes a CPU and a memory such as a RAM or a ROM. The memory stores program codes or commands that allow the CPU to execute processes. The memory, or a computer readable medium, includes any available medium that is accessible by a versatile or dedicated computer. The controller 40 receives a signal output from the fuel pressure sensor 20. The controller 40 also receives signals that are output from, for example, a rotational speed sensor 50 that detects the speed of rotation produced by the engine, an acceleration amount sensor 51 that detects the amount of acceleration, a water temperature sensor 52 that detects the temperature of engine coolant, and a crank angle sensor 53 that detects the crank angle. The controller 40 controls, for example, the open degree of the throttle valve 16 and the ignition timing of the spark plug 18 based on the output signals from the sensors. Additionally, the controller 40 controls the driving amount of the fuel pump 33 based on the output signals from the sensors, for example, to adjust the fuel pressure of the fuel supply passage 31 to fixed target fuel pressure.

The fuel injection valve 19 includes a valve member that is opened when energized. The controller 40 energizes the fuel injection valve 19 to open the valve member so that the fuel is injected from the fuel injection valve 19 to the combustion chamber 13, When the energizing time is set to be less than an energizing time needed for the valve member to reach a fully open position, partial lift injection is performed. The partial lift injection does not open the valve member at the fully open position. More specifically, as indicated by solid lines in FIG. 2, in the partial lift injection (hereafter, referred to as "the P/L injection"), an energizing time Tp, which is from when the energizing is started until the de-energizing, is shorter than an energizing time Tfmin, which is needed for the valve member to reach the fully open position (Tp<Tfmin). As indicated by the solid lines in FIG. 2, at timing t1, the energizing is started to start to move the valve member of the fuel injection valve 19 in a valve opening direction. Then, the fuel injection valve 19 is de-energized at timing t2, which is before the valve member reaches the fully open position. Consequently, the movement direction of the valve member is switched to a valve closing direction before timing t3, at which the valve member reaches the fully open position. The valve member does not reach the fully open position and returns to a fully closed position.

When the energizing time is set to be greater than or equal to the energizing time Tfmin, which is needed for the valve member to reach the fully open position, full lift injection is performed. The full lift injection opens the valve member at the fully open position. More specifically, as indicated by single-dashed lines in FIG. 2, in the full lift injection (hereafter, referred to as "the F/L injection"), an energizing time Tf, which is from when the energizing is started until the de-energizing, is greater than or equal to the energizing time Tfmin (Tf≥Tfmin). Thus, as indicated by the single-dashed lines in FIG. 2, at timing t1, the energizing of the fuel injection valve 19 is started to start to move the valve member in the valve opening direction. Then, the fuel injection valve 19 is de-energized at timing t4, which is after timing t3 at which the valve member reaches the fully open position. After the valve member reaches the fully open position at timing t3, the valve member maintains the fully open position until timing t4 and then returns to the fully closed position.

As shown in FIG. 1, the controller 40 includes an energizing time setting unit 41, which sets the energizing time of the fuel injection valve 19, and a fuel pressure calculation unit 42, which calculates fuel pressure. The fuel pressure is the pressure of fuel supplied to the fuel injection valve 19. The fuel pressure calculation unit 42 calculates the fuel pressure of the fuel supply passage 31 based on output signals of the fuel pressure sensor 20 that are input to the controller 40 in predetermined cycles. The controller 40 further includes a smoothening process unit 43, which performs a smoothening process on the fuel pressure calculated by the fuel pressure calculation unit 42 to calculate graded fuel pressure, which is obtained by smoothening fluctuations of the fuel pressure that occur when the fuel injection valve 19 injects the fuel. The fuel pressure is reduced by the fuel injection and then increased to target fuel pressure. The smoothening process unit 43 stores the fuel pressure calculated by the fuel pressure calculation unit 42 in the predetermined cycles and calculates the arithmetic mean. This smooths the fuel pressure, which is fluctuated by the fuel injection, and obtains the graded fuel pressure. The fuel pressure used to calculate the graded fuel pressure is obtained in the predetermined cycles regardless of the injection timing or the injection mode. It is preferred that the predetermined cycles in which the fuel pressure is calculated be sufficiently shorter than cycles in which the fuel is injected. The graded fuel pressure is updated whenever the fuel pressure calculation unit 42 calculates the fuel pressure. The controller 40 stores the updated graded fuel pressure.

The controller 40 further includes an injection amount calculation unit 44 and a minimum injection amount calculation unit 45. The injection amount calculation unit 44 calculates a request fuel injection amount Qd, which is a request value of the amount of fuel injected from the fuel injection valve 19 for each combustion performed in the combustion chamber 13. The minimum injection amount calculation unit 45 calculates a minimum fuel injection amount Qfmin of the F/L injection from the energizing time Tfmin, which is needed for the valve member to reach the fully open position. The energizing time Tfmin is changed by the fuel pressure. Increases in the fuel pressure increase the delay rate for opening the valve member and reduce the valve opening speed. Thus, the energizing time Tfmin becomes longer. As described above, the energizing time Tfmin is affected by the fuel pressure. The minimum fuel injection amount Qfmin is set based on the energizing time Tfmin and the fuel pressure. This indicates that the minimum fuel injection amount Qfmin is set in accordance with the fuel pressure. The controller 40 further includes a start timing setting unit 46, which sets the timing for starting to energize the fuel injection valve 19 to perform the fuel injection.

The series of processes for controlling the energizing of the fuel injection valve 19 performed by the controller 40 will now be described. The process is executed in predetermined cycles. For example, in the present embodiment, the process executed whenever the crank angle reaches 30° before the top dead center (BTDC30°) in each cylinder 10A of the internal combustion engine.

Figure 3:
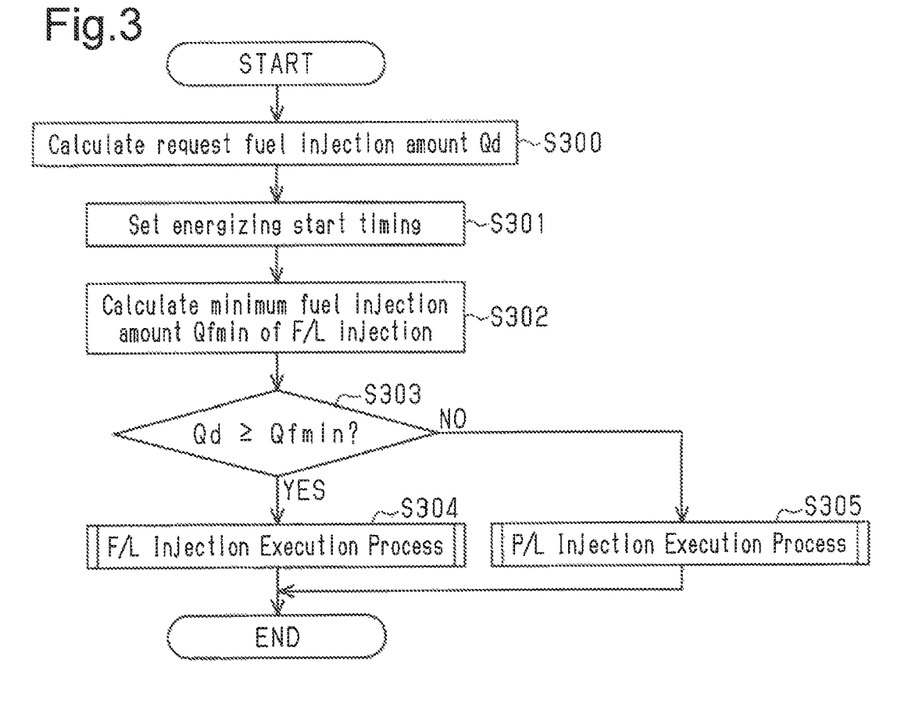
FIG. 3 is a flowchart showing the series of processes for controlling the energizing of a fuel injection valve performed by the controller of FIG. 1.

As shown in FIG. 3, when the controller 40 starts processing the series of processes, the injection amount calculation unit 44 calculates the request fuel injection amount Qd (step S300). The request fuel injection amount Qd is changed in accordance with the driving state of the internal combustion engine. The injection amount calculation unit 44 calculates the request fuel injection amount Qd, for example, based on the engine rotation speed and an engine load, which is calculated based on the acceleration amount. After the injection amount calculation unit 44 calculates the request fuel injection amount Qd, the start timing setting unit 46 sets the energizing start timing (step S301). The energizing start timing is set, for example, based on the engine rotation speed and the engine load.

Figure 4:
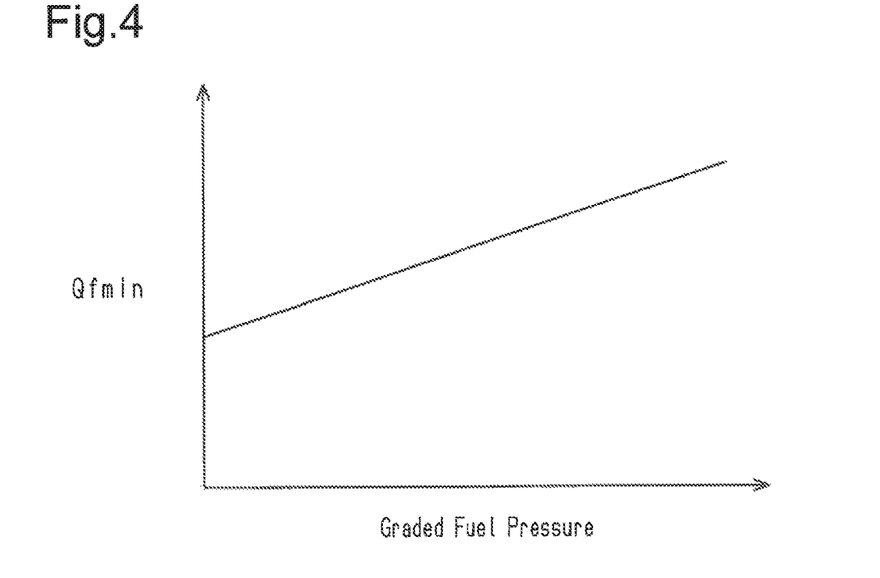
FIG. 4 is a map of the relationship between the minimum injection amount and the graded fuel pressure in the full lift injection.

When the start timing setting unit 46 sets the energizing start timing, the minimum injection amount calculation unit 45 calculates the minimum fuel injection amount Qfmin of the F/L injection (step S302). The minimum fuel injection amount Qfmin is an assumed fuel injection amount that is set based on the assumption that the energizing time of the fuel injection valve 19 is the same as the energizing time Tfmin, which is needed for the valve member to reach the fully open position. In step S302, the minimum injection amount calculation unit 45 calculates the minimum fuel injection amount Qfmin based on the map shown in FIG. 4. As described above, the minimum fuel injection amount Qfmin is set in accordance with the fuel pressure. Increases in the fuel pressure increase the injection amount per unit time. Thus, as the fuel pressure is increased, the fuel injection valve 19 injects a larger amount of fuel. As shown in FIG. 4, the minimum fuel injection amount Qfmin is increased in accordance with the increases in the fuel pressure. The fuel pressure used in step S302 is graded fuel pressure that is calculated by the smoothening process unit 43 and stored in the controller 40.

The controller 40 determines whether or not the request fuel injection amount. Qd is greater than or equal to the minimum fuel injection amount Qfmin (step S303). When the request fuel injection amount Qd is greater than or equal to the minimum fuel injection amount Qfmin, the energizing time needed to inject the fuel corresponding to the request fuel injection amount Qd is greater than or equal to the energizing time Tfmin. Thus, the driving state is such that the F/L injection is executed. Therefore, when the controller 40 determines in step S303 that the request fuel injection amount Qd is greater than or equal to the minimum fuel injection amount Qfmin (step S303: YES), the controller 40 proceeds to an F/L injection execution process (step S304).

When the request fuel injection amount Qd is less than the minimum fuel injection amount Qfmin, the energizing time needed to inject the fuel corresponding to the request fuel injection amount Qd is less than the energizing time Tfmin. Thus, the driving state is such that the P/L injection is executed. Therefore, when the controller 40 determines in step S303 that the request fuel injection amount Qd is less than the minimum fuel injection amount Qfmin (step S303: NO), the controller 40 proceeds to a P/L injection execution process (step S305).

The F/L injection execution process and the P/L injection execution process will now be described with reference to FIGS. 5 and 6.

Figure 5:
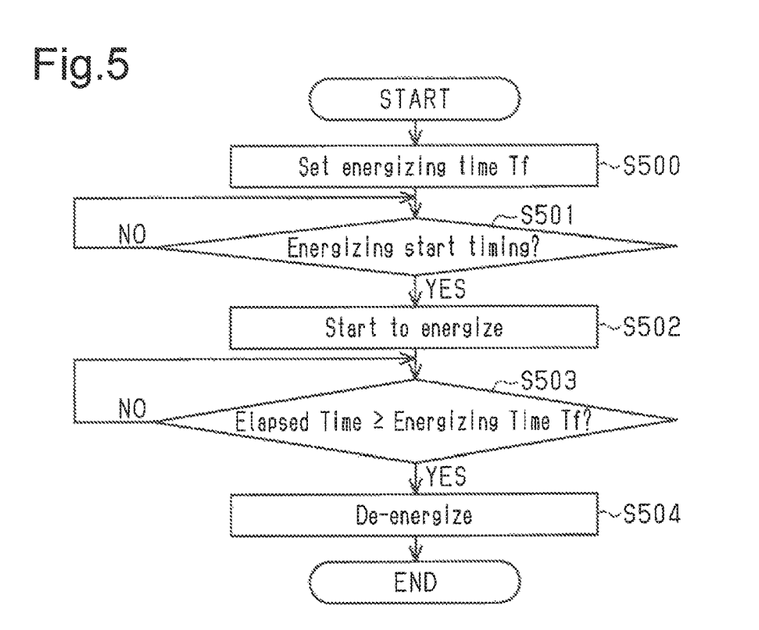
FIG. 5 is a flowchart showing the series of processes for performing the full lift injection.

As shown in FIG. 5, in the F/L injection execution process, the energizing time setting unit 41 sets the energizing time Tf of the F/L injection (step S500). The energizing time Tf is set based on the graded fuel pressure and the request fuel injection amount Qd. On the assumption that the fuel pressure has a fixed value that is equal to the graded fuel pressure while the injection is performed, the energizing time Tf is calculated as an energizing time that is needed to inject the fuel in an amount equal to the request fuel injection amount Qd. Decreases in the graded fuel pressure decrease the injection amount per unit time. Thus, the energizing time Tf becomes longer. Additionally, as the request fuel injection amount Qd is increased, the energizing time Tf, or the injection time, becomes longer. Therefore, in step S500, the energizing time setting unit 41 sets the energizing time Tf to be longer as the graded fuel pressure is reduced and the request fuel injection amount Qd is increased.

The controller 40 determines whether or not the energizing start timing, which was set in step S301, has arrived (step SS01). The controller 40 may determine whether or not the energizing start timing has arrived based on the crank angle. When the controller 40 determines in step S501 that the energizing start timing has not arrived (step S501: NO), the controller 40 does not proceed to the subsequent process and repeats step S501. When time elapses and the energizing start timing has arrived, the controller 40 determines in step S501 that the energizing start timing has arrived (step S501: YES) and proceeds to step S50.

In step S502, the controller 40 starts to energize the fuel injection valve 19 with the energizing time set to the energizing time Tf. When the energizing is started, the controller 40 starts to count an elapsed time. The controller 40 proceeds to step S503 and determines whether the elapsed time is greater than or equal to the energizing time Tf. When the controller 40 determines that the elapsed time is less than the energizing time Tf (step S503: NO), the controller 40 does not proceed to the subsequent process and repeats step S503. When the time elapsed from when the energizing is started has reached the energizing time Tf, the controller 40 determines in step S503 that the elapsed time is greater than or equal to the energizing time Tf (step S503: YES) and stops the energizing (step S504). When the positive determination is made in step S503, the controller 40 stops counting the elapsed time and resets the elapsed time. When the energizing is performed for the energizing time Tf from the energizing start timing as described above, the controller 40 ends the F/L injection execution process.

Figure 6:
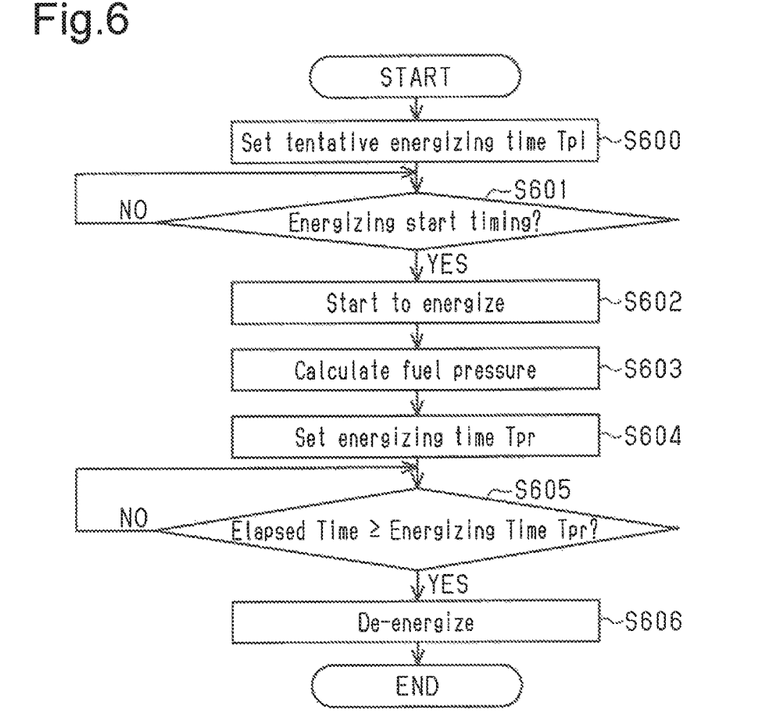
FIG. 6 is a flowchart showing the series of processes for performing the partial lift injection.

As shown in FIG. 6, in the P/L injection execution process, the energizing time setting unit 41 sets the energizing time for the P/L injection to a tentative energizing time Tpi (step S600). The tentative energizing time Tpi is a tentative energizing time that is set based on the graded fuel pressure and the request fuel injection amount Qd. On the assumption that the fuel pressure has a fixed value that is equal to the graded fuel pressure while the injection is performed, the tentative energizing time Tpi is calculated as an energizing time needed to inject the fuel in an amount that is equal to the request fuel injection amount Qd. In the same manner as step S500, in step S600, the energizing time setting unit 41 sets the tentative energizing time Tpi to be longer as the graded fuel pressure is reduced and the request fuel injection amount Qd is increased.

The controller 40 determines whether or not the energizing start timing, which was set in step S301, has arrived (step S601). When the controller 40 determines in step S601 that the energizing start timing has not arrived (step S601: NO), the controller 40 does not proceed to the subsequent process and repeats step S601. When time elapses and the energizing start timing has arrived, the controller 40 determines in step S601 that the energizing start timing has arrived (step S601: YES) and proceeds to step S602.

In step S602, the controller 40 starts to energize the fuel injection valve 19 with the energizing time set to the tentative energizing time Tpi. When the energizing is started, the controller 40 starts to count an elapsed time. In the P/L injection execution process, when the controller 40 starts the energizing, the fuel pressure calculation unit 42 calculates the fuel pressure of the fuel supply passage 31 (step S603). Hereafter, fuel pressure that is calculated by the fuel pressure calculation unit 42 when the energizing is started in the P/L injection is referred to as the energizing fuel pressure. The energizing fuel pressure corresponds to fuel pressure obtained during the P/L injection.

When the energizing fuel pressure is calculated, the energizing time setting unit 41 sets the energizing time for the P/L injection to an energizing time Tpr based on the energizing fuel pressure (step S604). More specifically, while performing the energizing, the energizing time setting unit 41 resets the energizing time from the tentative energizing time Tpi to the energizing time Tpr. The energizing time Tpr is set based on the energizing fuel pressure and the request fuel injection amount Qd. On the assumption that the fuel pressure has a fixed value that is equal to the energizing fuel pressure while the injection is performed, the energizing time Tpr is calculated as an energizing time needed to inject the fuel in an amount that is equal to the request fuel injection amount Qd. Decreases in the energizing fuel pressure reduce the delay rate for opening the valve member and increase the valve opening speed. More specifically, as the energizing fuel pressure is decreased, the injection is started at an earlier timing and the injection amount is increased in the P/L injection. Thus, as the energizing fuel pressure is decreased, the energizing time Tpr becomes shorter. Additionally, as the request fuel injection amount Qd is decreased, the energizing time Tpr becomes shorter. Therefore, in step S604, the energizing time setting unit 41 sets the energizing time Tpr to be shorter as the energizing fuel pressure is decreased and the request fuel injection amount Qd is decreased.

The controller 40 proceeds to step S605 and determines whether or not the time elapsed from when the energizing is started is greater than or equal to the energizing time Tpr. When the controller 40 determines that the elapsed time is less than the energizing time Tpr (step S605: NO), the controller 40 does not proceed to the subsequent process and repeats step S605. When the time elapsed from when the energizing is started has reached the energizing time Tpr, the controller 40 determines in step S605 that the elapsed time is greater than or equal to the energizing time Tpr (step S605: YES) and stops the energizing (step S606). When the positive determination is made in step S605, the controller 40 stops counting the elapsed time and resets the elapsed time. As described above, when the energizing is performed for the energizing time Tpr from the energizing start timing, the controller 40 ends the P/L injection execution process.

As shown in FIG. 3, when the controller 40 executes the F/L injection execution process (step S304) or the P/L injection execution process (step S305), the controller 40 ends the series of the processes for controlling the energizing of the fuel injection valve 19.

The operation and advantages of the present embodiment will now be described.

(1) The fuel pressure is gradually decreased when the fuel injection is started. In the F/L injection, in which the energizing time is relatively long, the difference in the fuel pressure is increased between when the injection is started and when the injection is ended. In the F/L injection, the fuel pressure is largely decreased from the injection start time to the injection end time. The fuel pressure is again increased when the F/L injection is ended. As indicated by the solid line in FIG. 7, the fuel pressure fluctuates when the full lift injection is repeatedly performed. In the F/L injection, the large difference in the fuel pressure between the injection start time and the injection end time increases the difference in the injection amount per unit time between the injection start time and the injection end time. Thus, to improve the accuracy for controlling the injection amount, it is desired that the energizing time be set based on average fuel pressure from the injection start time to the injection end time.

In the present embodiment, the energizing time Tf of the F/L injection is set based on the graded fuel pressure. As indicated by the single-dashed line in FIG. 7, the graded fuel pressure is an arithmetic mean of the fuel pressure calculated by the fuel pressure calculation unit 42. Thus, fluctuations of the fuel pressure that occur when the fuel injection valve 19 injects the fuel are smoothened at the graded fuel pressure. The graded fuel pressure is proximate to the average fuel pressure obtained during the F/L injection as compared fuel pressure obtained when the F/L injection is started or ended. Therefore, in the present embodiment, the energizing time Tf of the F/L injection is set based on the fuel pressure that is proximate to the average fuel pressure obtained during the F/L injection.

Figure 7:
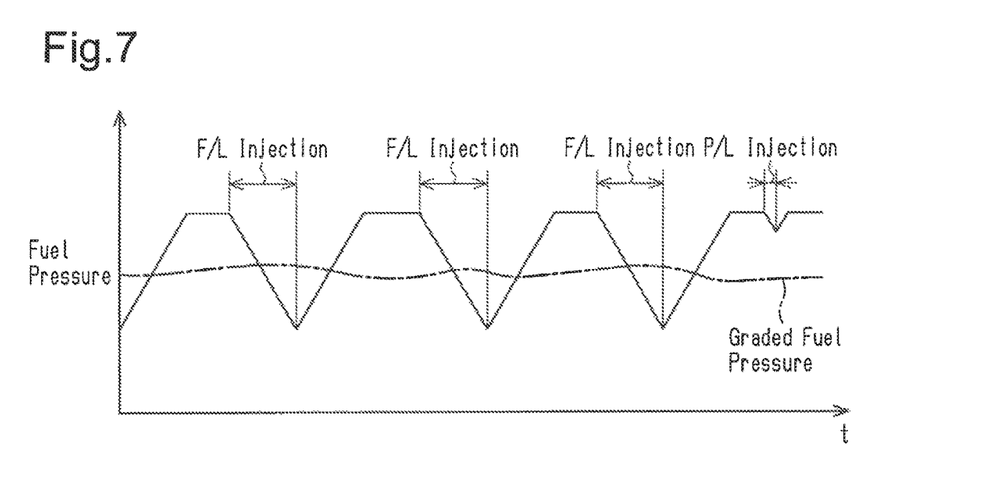
FIG. 7 is a time chart showing changes in fuel pressure when performing the partial lift injection and the full lift injection.

As indicated by the solid line in FIG. 7, the energizing time for the P/L injection is shorter than that for the F/L injection. The changes in the fuel pressure caused by the fuel injection are small. In the P/L injection, since the fuel injection valve 19 is de-energized before the valve member reaches the fully open position, the injection amount is largely affected by the valve opening delay of the valve member when energized and the valve opening speed. The delay rate for opening the valve member and the valve opening speed are largely affected by the fuel pressure obtained when the energizing is started. In the P/L injection, to improve the accuracy for controlling the injection amount, it is desired that the energizing time be set based on the fuel pressure obtained when the injection is started. In in the P/L injection, the injection amount is small and subtly affects the fuel pressure. In the present embodiment, the energizing time for the P/L injection is set based on fuel pressure calculated by the fuel pressure calculation unit 42 instead of the graded fuel pressure. Thus, the energizing time for the P/L injection is set based on fuel pressure that changes in accordance with the actual state and differs from the graded fuel pressure. More specifically, the energizing time for the P/L injection is set taking into consideration changes in the valve opening delay of the valve member and the valve opening speed caused by the fuel pressure. In the present embodiment, the fuel pressure is appropriately set in the F/L injection and the P/L injection. This improves the accuracy for controlling the injection amount of each of the P/L injection and the F/L injection.

(2) In the present embodiment, the energizing fuel pressure, which is obtained when the energizing is started, is calculated in the P/L injection execution process. The energizing time Tpr of the P/L injection is set based on the energizing fuel pressure. Thus, when the P/L injection is performed, the actual fuel pressure acting on the valve member reflects the calculation of the energizing time Tpr.

Second Embodiment

A second embodiment of the controller 40 will now be described with reference to FIGS. 8 to 10. The second embodiment differs from the first embodiment in the energizing control performed on the fuel injection valve 19. In the second embodiment, the energizing of the fuel injection valve 19 is controlled to perform multi-injection so that the fuel corresponding to the request fuel injection amount Qd, which is calculated by the injection amount calculation unit 44, is divided and injected over a number of times. In the multi-injection performed in the second embodiment, the fuel injection valve 19 injects the fuel that corresponds to the request fuel injection amount Qd through two injections of the P/L injection and the F/L injection. The energizing control performed on the fuel injection valve 19 will now be described focusing the process that differs from the first embodiment. The process that is the same as the first embodiment will not be described in detail.

Figure 8:
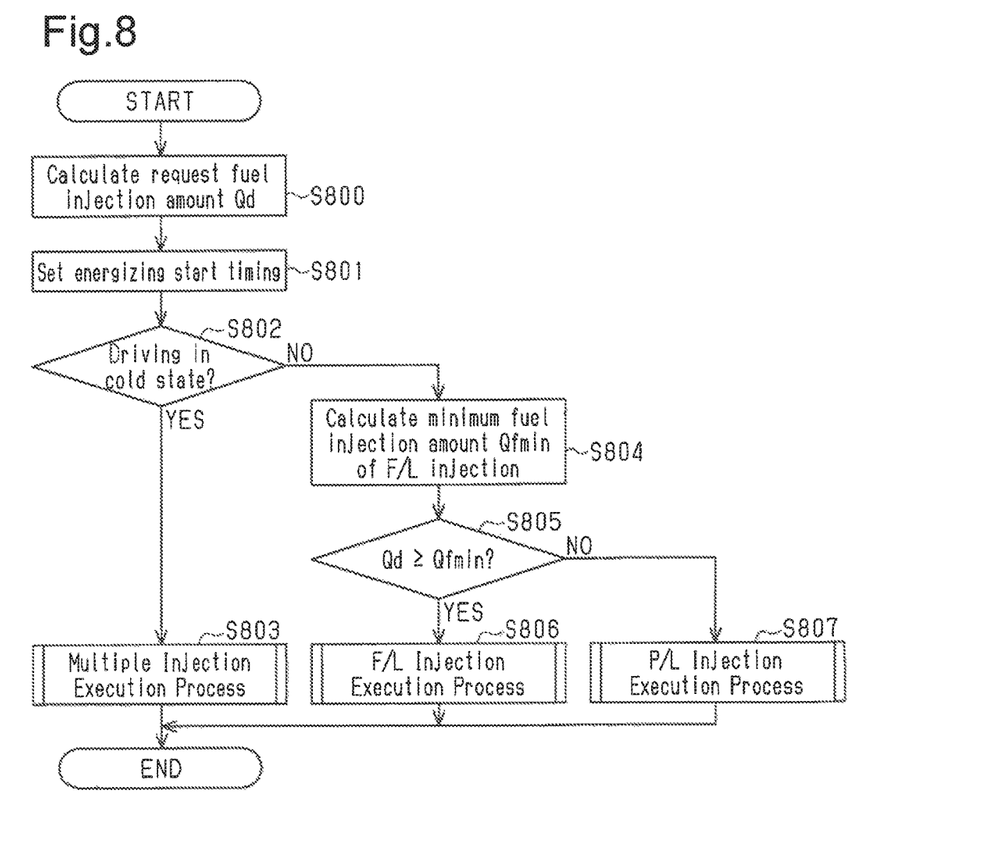
FIG. 8 is a flowchart showing the series of processes for controlling the energizing of the fuel injection valve performed by a second embodiment of a controller.

As shown in FIG. 8, when the controller 40 starts the series of processes for controlling the energizing of the fuel injection valve 19, the injection amount calculation unit 44 calculates the request fuel injection amount Qd (step S800). After the injection amount calculation unit 44 calculates the request fuel injection amount Qd, the start timing setting unit 46 sets the energizing start timing (step S801). When the start timing setting unit 46 sets the energizing start timing, the controller 40 determines whether or not the internal combustion engine is driven in a cold state (step S802). In step S802, the controller 40 determines that the internal combustion engine is driven in a cold state, for example, when the temperature of engine coolant detected by the water temperature sensor 52 is lower than or equal to a predetermined temperature. When the internal combustion engine is driven in a cold state, evaporation of the fuel injected into the combustion chamber 13 is impeded. This may adversely affect the combustion performance. The predetermined temperature may be set to a temperature of the engine coolant that may adversely affect the combustion performance of the internal combustion engine. In the second embodiment, when the controller 40 determines in step S802 that the internal combustion engine is driven in a cold state (step S802: YES), that is, the driving state may adversely affect the combustion performance of the internal combustion engine, the controller 40 proceeds to a multi-injection execution process (step S803). In the multi-injection of the second embodiment, the fuel injection valve 19 mostly injects the fuel corresponding to the request fuel injection amount Qd through the F/L injection. Subsequent to the F/L injection, the fuel of the remaining amount is injected through the P/L injection. This obtains an atmosphere in which the concentration of the fuel is increased around the spark plug 18 immediately before the ignition timing. Thus, the adverse effect on the combustion performance is limited even when the engine is driven in a cold state. In the second embodiment, when the engine is driven in a cold state, even after the P/L injection is performed, the request fuel injection amount Qd is set so that the fuel injection amount of the F/L injection will not be decreased to the minimum fuel injection amount Qfmin or below.

Figure 9:
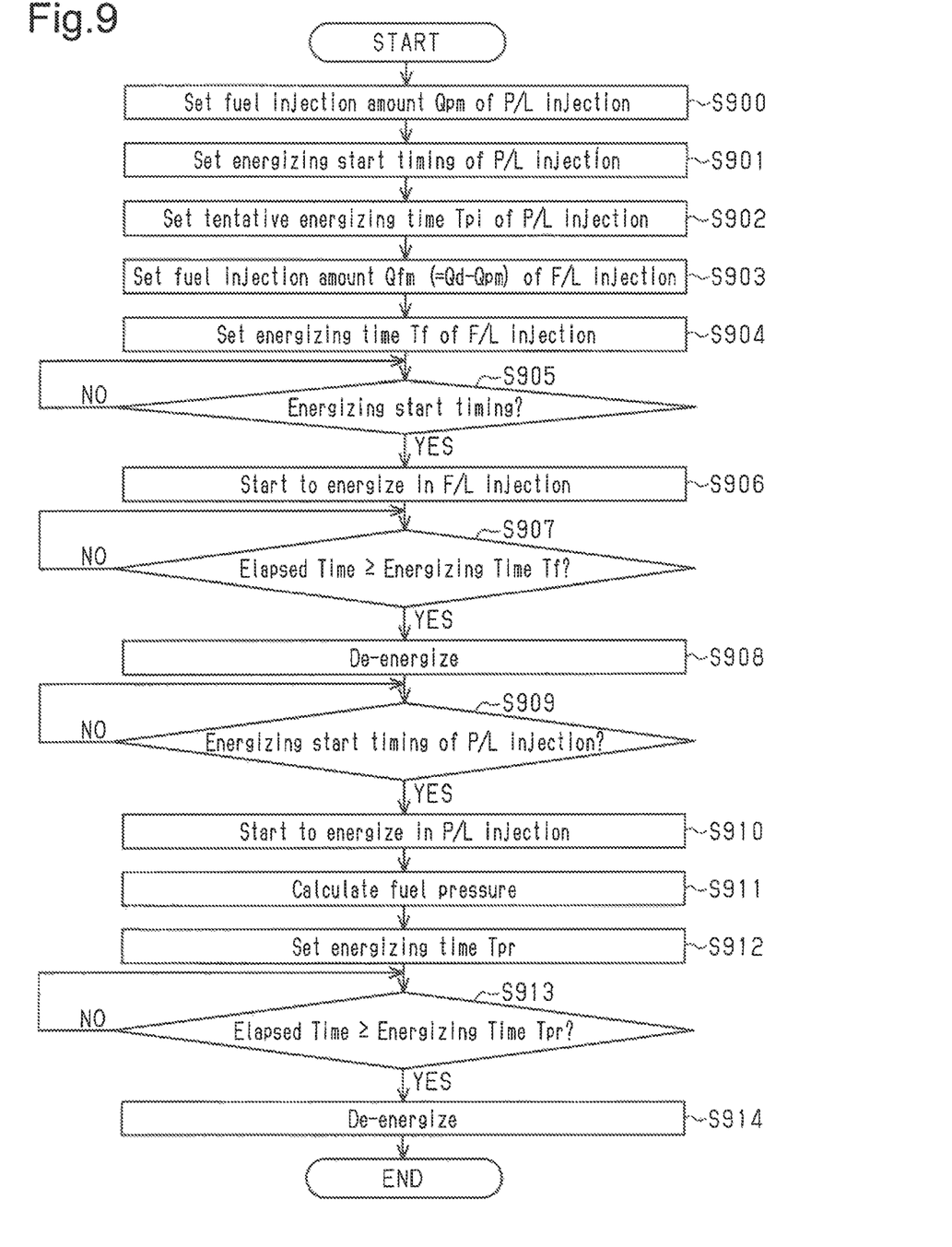
FIG. 9 is a flowchart showing the series of processes for performing multi-injection.
Figure 10:
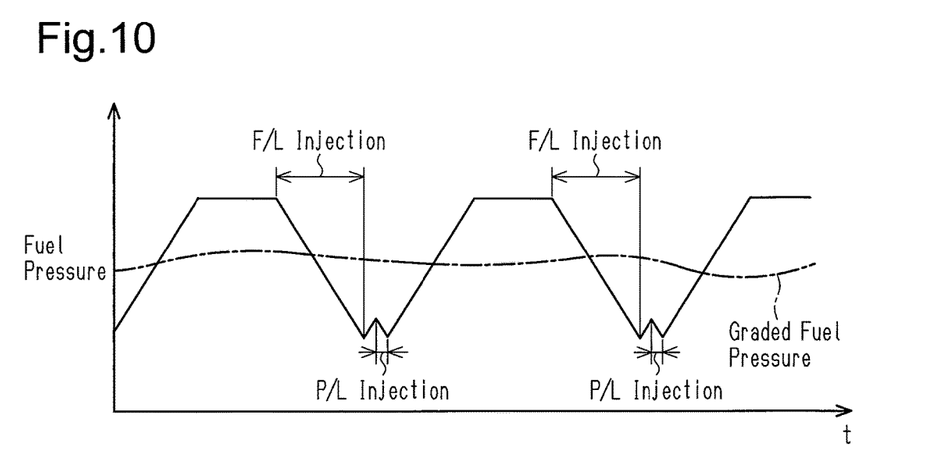
FIG. 10 is a time chart showing changes in fuel pressure when performing the multi-injection.

As shown in FIG. 9, in the multi-injection execution process, the controller 40 sets a fuel injection amount Qpm of the P/L injection (S900). The fuel injection amount Qpm is set to an amount of fuel needed to improve the combustion performance of the internal combustion engine. The fuel injection amount Qpm may be obtained in advance through tests or simulations. When the controller 40 sets the fuel injection amount Qpm, the start timing setting unit 46 sets an energizing start timing of the P/L injection (step S901). The energizing start timing of the P/L injection is set to be after the energizing start timing that was set in step S801 so that the energizing start timing of the P/L injection arrives after the timing for the de-energizing of the F/L injection, More specifically, the timing for performing the F/L injection is set so as not to overlap the timing of the P/L injection that is subsequently performed. Additionally, the energizing start timing of the P/L injection is set, for example, based on the engine rotation speed and the engine load so that the fuel concentrates around the spark plug 18 immediately before the ignition timing.

When the start timing setting unit 46 sets the energizing start timing of the P/L injection, the energizing time setting unit 41 calculates a tentative energizing time Tpi as the energizing time for the P/L injection (step S902). The tentative energizing time Tpi is a tentative energizing time for the P/L injection that is set based on the graded fuel pressure and the fuel injection amount Qpm. On the assumption that the fuel pressure has a fixed value that is equal to the graded fuel pressure while the injection is performed, the tentative energizing time Tpi is calculated as an energizing time that is needed to inject the fuel in an amount equal to the fuel injection amount Qpm. In step S902, the energizing time setting unit 41 sets the tentative energizing time Tpi to be longer as the graded fuel pressure is decreased and the fuel injection amount Qpm is increased.

As described above, when the controller 40 sets the fuel injection amount Qpm, the energizing start timing, and the tentative energizing time Tpi of the P/L injection, the controller 40 sets a fuel injection amount Qfm of the F/L injection (step S903). In step S903, the controller 40 sets the fuel injection amount Qfm by subtracting the fuel injection amount Qpm of the P/L injection from the request fuel injection amount Qd (Qfm=Qd−Qpm). Then, the energizing time setting unit 41 sets the energizing time for the F/L injection to an energizing time Tf (step S904). The energizing time Tf is set based on the graded fuel pressure and the fuel injection amount Qfm. On the assumption that the fuel pressure has a fixed value that is equal to the graded fuel pressure while the injection is performed, the energizing time Tf is calculated as an energizing time that is needed to inject the fuel in an amount equal to the fuel injection amount Qfm. This sets the energizing time Tf to be longer as the graded fuel pressure is decreased and the fuel injection amount Qfm is increased.

The controller 40 determines whether or not the energizing start timing that was set in step S801 has arrived (step S905). When the controller 40 determines in step S905 that the energizing start timing has not arrived (step S905: NO), the controller 40 does not proceed to the subsequent process and repeats step S905. When time elapses and the energizing start timing has arrived, the controller 40 determines in step S905 that the energizing start timing has arrived (step S905: YES) and proceeds to step S906.

In step S906, the controller 40 starts to energize the fuel injection valve 19 with the energizing time set to the energizing time Tf. When the energizing is started, the controller 40 starts to count an elapsed time. The controller 40 proceeds to step S907 and determines whether or not the elapsed time is greater than or equal to the energizing time Tf. When the controller 40 determines that the elapsed time is less than the energizing time Tf (step S907: NO), the controller 40 does not proceed to the subsequent process and repeats step S907. When the time elapsed from when the energizing is started has reached the energizing time Tf, the controller 40 determines in step S907 that the elapsed time is greater than or equal to the energizing time Tf (step S907: YES) and stops the energizing (step S908). When the positive determination is made in step S907, the controller 40 stops counting the elapsed time and resets the elapsed time. Steps S906 to S908 perform the F/L injection.

The controller 40 determines whether or not the energizing start timing of the P/L injection that was set in step S901 has arrived (step S909). When the controller 40 determines in step S909 that the energizing start timing of the P/L injection has not arrived (step S909: NO), the controller 40 does not proceed to the subsequent process and repeats step S909. When time elapses and the energizing start timing of the P/L injection has arrived, the controller 40 determines in step S909 that the energizing start timing of the P/L injection has arrived (step S909: YES) and proceeds to step S910.

In step S910, the controller 40 resumes the energizing of the fuel injection valve 19. The energizing started at this time corresponds to the energizing of the fuel injection valve 19 with the energizing time set to the tentative energizing time Tpi. When the energizing is started, the controller 40 starts to count an elapsed time. When the controller 40 starts the energizing, the fuel pressure calculation unit 42 calculates the fuel pressure of the fuel supply passage 31 (step S911). That is, the energizing fuel pressure is calculated.

When the energizing fuel pressure is calculated, the energizing time setting unit 41 sets the energizing time for the P/L, injection to the energizing time Tpr based on the energizing fuel pressure (step S912). More specifically, while performing the energizing, the energizing time setting unit 41 resets the energizing time from the tentative energizing time Tpi to the energizing time Tpr. The energizing time Tpr is set based on the energizing fuel pressure and the fuel injection amount Qpm. On the assumption that the fuel pressure has a fixed value that is equal to the energizing fuel pressure while the injection is performed, the energizing time Tpr is calculated as an energizing time that is needed to inject the fuel in an amount equal to the fuel injection amount Qpm. Decreases in the energizing fuel pressure reduce the delay rate for opening the valve member and increase the valve member opening speed. Thus, decreases in the energizing fuel pressure shorten the energizing time Tpr. Additionally, decreases in the fuel injection amount Qpm shorten the energizing time Tpr. Therefore, in step S912, the energizing time setting unit 41 sets the energizing time Tpr to be shorter as the energizing fuel pressure is decreased and the fuel injection amount Qpm is decreased.

The controller 40 proceeds to step S913 and determines whether or not the elapsed time is greater than or equal to the energizing time Tpr. When the controller 40 determines that the elapsed time is less than the energizing time Tpr (step S913: NO), the controller 40 does not proceed to the subsequent process and repeats step S913. When the time elapsed from when the energizing is started has reached the energizing time Tpr, the controller 40 determines in step S913 that the elapsed time is greater than or equal to the energizing time Tpr (step S913: YES) and stops the energizing (step S914). When the positive determination is made in step S913, the controller 40 stops counting the elapsed time and resets the elapsed time. Steps S910 to S914 are processed to perform the F/L injection, which injects the remaining amount of the fuel corresponding to the request fuel injection amount Qd that was not injected through the F/L injection.

When the multi-injection execution process (step S803) is executed as described above, the controller 40 ends the series of the processes for controlling the energizing of the fuel injection valve 19 as shown in FIG. 8.

In step S802, when the controller 40 does not determine that the internal combustion engine is driven in a cold state (step S802: NO), the controller 40 proceeds to step S804. In step S804, in the same manner as the first embodiment, the minimum injection amount calculation unit 45 calculates the minimum fuel injection amount Qfmin of the F/L injection based on the map shown in FIG. 4. The controller 40 determines whether or not the request fuel injection amount Qd is greater than or equal to the minimum fuel injection amount Qfmin (step S805). When the controller 40 determines that the request fuel injection amount Qd is greater than or equal to the minimum fuel injection amount Qfmin (step S805: YES), the controller 40 proceeds to the F/L injection execution process (step S806).

When the controller 40 determines that the request fuel injection amount Qd is less than the minimum fuel injection amount Qfmin (step S805: NO), the controller 40 proceeds to the P/L injection execution process (step S807). The F/L injection execution process of step S806 is the same as the F/L injection execution process of step S304 of the first embodiment. The P/L injection execution process of step S807 is the same as the P/L injection execution process of step S305 of the first embodiment. These processes will not be described in detail.

In the second embodiment, when the controller 40 executes the multi-injection execution process (step S803), the F/L injection execution process (step S806), or the P/L injection execution process (step S807), the controller 40 ends the series of the processes for controlling the energizing of the fuel injection valve 19.

The second embodiment has the advantage described below in addition to advantages (1) and (2).

(3) In the second embodiment, when the multi-injection is performed, the fuel corresponding to the request fuel injection amount Qd is divided and injected through two injections of the P/L injection and the F/L injection. More specifically, the fuel corresponding to the request fuel injection amount Qd is mostly injected through the F/L injection. Then, the fuel of the remaining amount is injected through the P/L injection. The F/L injection largely changes the fuel pressure. This tends to increase the difference between the fuel pressure obtained immediately before starting the fuel injection or immediately after ending the fuel injection, which is indicated by the solid line in FIG. 10, and the graded fuel pressure calculated by smoothening fluctuations in the fuel pressure that are caused by the fuel injection, which is indicated by the single-dashed line in FIG. 10. When the fuel corresponding to the request fuel injection amount Qd is divided and injected over a number of times, for example, through the multi-injection, the injection period is limited. This shortens intervals between fuel injections. More specifically, in the second embodiment, as indicated by the solid line in FIG. 10, the P/L injection is performed immediately after the F/L injection is ended. This increases the difference between the fuel pressure obtained during the P/L injection and the graded fuel pressure.

In the second embodiment, the fuel corresponding to the request fuel injection amount Qd is divided and injected over two times. This tends to shorten the interval of the F/L injection and the P/L injection. With this configuration, the energizing time of the P/L injection is set based on the energizing fuel pressure calculated by the fuel pressure calculation unit 42. This allows the fuel pressure to be appropriately set even though the configuration has a tendency to increase the difference between the fuel pressure obtained during the P/L injection and the graded fuel pressure. Thus, decreases in the accuracy of the injection amount of the P/L injection are limited.

The above embodiments may be modified as follows.

In the second embodiment, it is assumed that the request fuel injection amount Qd corresponds to an amount of fuel that allows the F/L injection and the P/L injection to be performed. However, the request fuel injection amount Qd that is set in the cold driving state does not have to be set to a sufficient amount of fuel for performing the multi-injection. In this case, for example, if the request fuel injection amount Qd is not a sufficient amount of fuel for performing the multi-injection during the cold driving state, the execution of the multi-injection may be prohibited, and one of the F/L injection and the P/L injection may be executed. Alternatively, the request fuel injection amount Qd may be reset by adding a predetermined amount of fuel to the request fuel injection amount Qd to obtain the sufficient amount of fuel for performing the multi-injection.

In the second embodiment, the fuel injection amount Qpm of the P/L injection may be set to a fixed value or a variable value. In the case of the variable setting, the fuel injection amount Qpm may be set to be greater, for example, as the temperature of the engine coolant is decreased. In another setting, the fuel injection amount Qpm may be set by multiplying the request fuel injection amount Qd by a predetermined coefficient. The multi-injection can be performed as long as each fuel injection amount is set so that the fuel injection amount Qpm of the P/L injection is less than the minimum fuel injection amount Qfmin of the F/L injection and the fuel injection amount Qfm of the F/L injection is greater than or equal to the minimum fuel injection amount Qfmin of the F/L injection. The mode for setting the fuel injection amount may be changed within the range of the above conditions.

In the second embodiment of the multi-injection, the P/L injection is performed after the F/L injection. However, the order for performing the F/L injection and the P/L injection may be changed. For example, a diesel engine uses an injection mode that injects a small amount of fuel as a pilot injection prior to a main injection to increase the temperature of the combustion chamber 13 in advance. In such a configuration, the pilot injection can be performed by the P/L injection while the subsequent main injection is performed by the F/L injection. In such a configuration, the F/L injection is performed after the P/L injection.

In the multi-injection execution process, the number of times that the fuel corresponding to the request fuel injection amount Qd is divided and injected is not limited to two and may be three or four or more. In such a case, the P/L injection may be continuously performed multiple times. Also, the F/L injection may be continuously performed multiple times.

In the P/L injection execution process, the tentative energizing time Tpi is set based on the graded fuel pressure and one of the request fuel injection amount Qd and the fuel injection amount Qpm. However, the setting of the tentative energizing time Tpi is not limited to that described above. For example, a predetermined fixed time may be used as the tentative energizing time Tpi. In this configuration, the tentative energizing time Tpi is set to a time that continues the energizing until the calculation of the energizing time Tpr. Even in such a configuration, the energizing time Tpr is reset based on the fuel pressure calculated after the energizing of the P/L injection is started. Thus, the above operation and advantages are obtained.

In the P/L injection execution process, after the energizing of the P/L injection is started, the fuel pressure is calculated as the energizing fuel pressure. However, the timing for calculating the fuel pressure with the fuel pressure calculation unit 42 may be changed. The fuel pressure may be calculated, for example, immediately before the energizing of the P/L injection is started. In this case, the energizing time Tpr may be set based on the calculated fuel pressure. Then, the energizing may be performed. This configuration dispenses with the process for calculating the tentative energizing time Tpi before the energizing is started and setting the energizing time to the tentative energizing time Tpi. Even in the configuration that calculates the fuel pressure immediately before the energizing of the P/L injection is started, the energizing time may be first set to the tentative energizing time Tpi and then reset to the energizing time Tpr. Further, in the P/L injection execution process, the fuel pressure may be calculated at the same time when the energizing is started with the energizing time set to the tentative energizing time Tpi. Then, the energizing time may be set to the energizing time Tpr. In any case, the energizing time Tpr may be set based on the calculated fuel pressure, and the energizing may be performed for the energizing time Tpr.

The calculation of the graded fuel pressure performed by the smoothening process unit 43 is not limited to the arithmetic mean. For example, a weighted mean may be used. Further, all of the values calculated by the fuel pressure calculation unit 42 do not necessarily have to be used to calculate the graded fuel pressure. A predetermined number of calculated values may be used to calculate the graded fuel pressure. Any calculation may be used as long as fluctuations in the fuel pressure that occur when the fuel injection valve 19 injects the fuel are smoothened to obtain the graded fuel pressure, which is proximate to the average fuel pressure obtained during the F/L injection.

The fuel pressure calculation unit 42 calculates the fuel pressure of the fuel supply passage 31 based on the output signal of the fuel pressure sensor 20. However, the calculation of the fuel pressure of fuel supplied to the fuel injection valve 19 is not limited to the above calculation. The fuel pressure of the fuel supply passage 31 may be calculated, for example, by an estimation based on the driving amount of the fuel pump 33 and the capacity of the fuel supply passage 31.

In each of the embodiments, in step S303 or S805, the comparison of the request fuel injection amount Qd with the minimum fuel injection amount Qfmin is used to determine whether the controller 40 proceeds to the F/L injection execution process or the P/L injection execution process. This configuration may be changed. For example, after the request fuel injection amount Qd is calculated, a necessary energizing time Td needed to inject the fuel corresponding to the request fuel injection amount Qd is calculated on the assumption that the fuel pressure has a fixed value that is equal to the graded fuel pressure while the injection is performed. The necessary energizing time Td is compared with the energizing time Tfmin, which is needed for the valve member of the fuel injection valve 19 to reach the fully open position. In this configuration, when the necessary energizing time Td is greater than or equal to the energizing time Tfmin (Td≥Tfmin), the F/L injection execution process may be performed. When the necessary energizing time Td is less than the energizing time Tfmin (Td<Tfmin), the P/L injection execution process may be performed.

The fuel injection valve 19 is not limited to a direct injection valve that injects the fuel into the combustion chamber 13. The same structure as the first embodiment may be applied, for example, to a port injection valve that injects the fuel into the intake passage 14.

Therefore, the present examples and embodiments are to be considered as illustrative and not restrictive and the invention is not to be limited to the details given herein, but may be modified within the scope and equivalence of the appended claims.

The invention claimed is:

1. A controller for an internal combustion engine, wherein the internal combustion engine includes a fuel injection valve and a fuel supply system, the fuel injection valve includes a valve member that opens and injects fuel when energized, the fuel supply system supplies fuel to the fuel injection valve, and the controller is configured to control the fuel injection valve so that the fuel injection valve selectively performs partial lift injection, which does not open the valve member at a fully open position, and full lift injection, which opens the valve member at the fully open position, the controller comprising:

an energizing time setting unit configured to set an energizing time of the fuel injection valve;

a fuel pressure calculation unit configured to calculate fuel pressure, which is pressure of the fuel supplied to the fuel injection valve; and a smoothening process unit configured to perform a smoothening process on the fuel pressure calculated by the fuel pressure calculation unit to calculate graded fuel pressure, at which fluctuation of the fuel pressure that occurs when the fuel injection valve injects fuel is smoothened, wherein the energizing time setting unit is configured to set an energizing time for the full lift injection based on the graded. fuel. pressure calculated by the smoothening process unit and set an energizing time for the partial lift injection based on the fuel pressure calculated by the fuel pressure calculation unit.

2. The controller according to claim 1, wherein the fuel pressure calculation unit is configured to calculate fuel pressure when the partial lift injection is being performed, and the energizing time setting unit is configured to set the energizing time for the partial lift injection based on the fuel pressure calculated by the fuel pressure calculation unit when the partial lift injection is being performed.

3. The controller according to claim 2, wherein
the fuel pressure calculation unit is configured to calculate the fuel pressure when energizing of the fuel injection valve is started to perform the partial lift injection, and
the energizing time setting unit is configured to set the energizing time for the partial lift injection based on the fuel pressure calculated when the energizing is started.

4. The controller according to claim 1, wherein
the fuel pressure calculation unit is configured to calculate fuel pressure in predetermined cycles,
the smoothening process unit is configured to calculate the graded fuel pressure based on the fuel pressure calculated in the predetermined cycles.

5. The controller according claim 1, wherein the energizing time setting unit is configured to set the energizing time for the full lift injection based on the graded fuel pressure calculated before the full lift injection is performed.

6. The controller according to claim 1, further comprising:
an injection amount calculation unit configured to calculate a request fuel injection amount, which is a request value of an amount of fuel injected from the fuel injection valve for each combustion in a combustion chamber of the internal combustion engine, wherein
the controller is configured to control the fuel injection valve so that the fuel injection valve performs multi-injection, which divides the fuel corresponding to the request fuel injection amount and injects the fuel over a multiple number of fuel injections, and
the multiple number of fuel injections include the partial lift injection and the full lift injection that are each performed at least once.

7. The controller according to claim 6, wherein the controller is configured to control the fuel injection valve so that the fuel injection valve performs the multi-injection when the internal combustion engine is driven in a cold state.

8. A method for controlling a, internal combustion. engine, wherein the internal combustion engine includes a fuel injection valve and a fuel supply system, the fuel injection valve includes a valve member that opens and injects fuel when energized, and the fuel supply system supplies fuel to the fuel injection valve, the method comprising:
setting an energizing time of the fuel injection valve;
calculating fuel pressure, which is pressure of the fuel supplied to the fuel injection valve;
performing a smoothening process on the calculated fuel pressure to calculate graded fuel pressure, at which fluctuation of the fuel pressure that occurs when the fuel injection valve injects fuel is smoothened;
controlling the fuel injection valve so that the fuel injection valve selectively performs partial lift injection, which does not open the valve member at a fully open position, and full lift injection, which opens the valve member at the fully open position;
setting an energizing time for the full lift injection based on the calculated graded fuel pressure; and
setting an energizing time for the partial lift injection based on the calculated fuel pressure.

9. A controller for an internal combustion engine, wherein the internal combustion engine includes a fuel injection valve and a fuel supply system, the fuel injection valve includes a valve member that opens and injects fuel when energized, and the fuel supply system supplies fuel to the fuel injection valve, the controller comprising:
circuitry configured to control the fuel injection valve so that the fuel injection valve selectively performs partial lift injection, which does not open the valve member at a fully open position, and full lift injection, which opens the valve member at the fully open position, wherein the circuitry is configured to perform
setting an energizing time of the fuel injection valve,
calculating fuel pressure, which is pressure of the fuel supplied to the fuel injection valve,
performing a smoothening process on the calculated fuel pressure to calculate graded fuel pressure, at which fluctuation of the fuel pressure that occurs when the fuel injection valve injects fuel is smoothened,
setting an energizing time for the full lift injection based on the calculated graded fuel pressure, and
setting an energizing time for the partial lift injection based on the calculated fuel pressure.

* * * * *